Feb. 25, 1941.   A. B. MERRILL ET AL   2,233,294
METHOD OF MAKING ENDLESS BELTS
Original Filed April 30, 1932
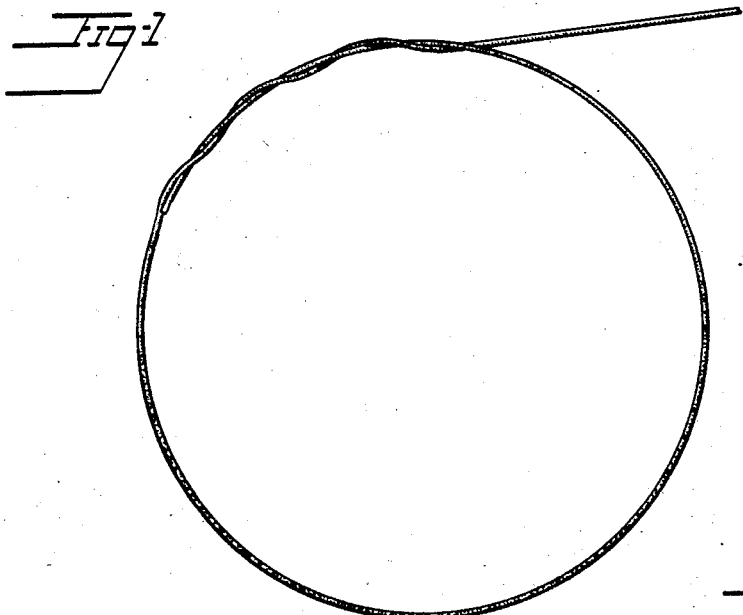
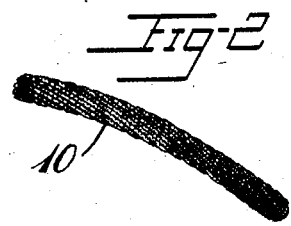
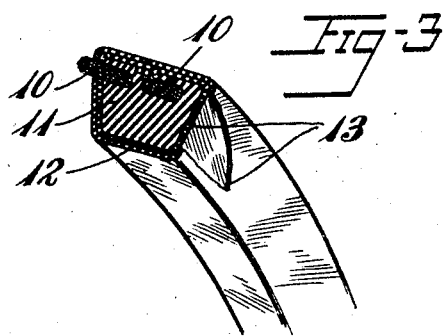
Inventors
Allan B. Merrill
George H. Stewart
By Eakin & Avery
Attys.

Patented Feb. 25, 1941

2,233,294

UNITED STATES PATENT OFFICE 2,233,294

METHOD OF MAKING ENDLESS BELTS

Allan B. Merrill and George H. Stewart, Akron, Ohio, assignors to The B. F. Goodrich Company, New York, N. Y., a corporation of New York Original application April 30, 1932, Serial No. 608,483, now Patent No. 2,029,381, dated February 4, 1936. Divided and this application November 20, 1935, Serial No. 50,762

5 Claims. (Cl. 154—4)

This invention relates to endless power-transmission belts and is of especial value in trapezoidal or V-type belts. This is a division of our copending application Serial No. 608,483, filed April 30, 1932, now Patent No. 2,029,381 of February 4, 1936.

The chief objects of the invention are to provide efficiency of power transmission and to provide a belt adapted to give long service.

We find that these objects are attained to a surprising extent by the belt of the present invention.

Of the accompanying drawing:

Fig. 1 is an elevation of a strand of belt-core material arranged to illustrate one of the features of the invention.

Fig. 2 is a perspective view of a portion of one of the belt cores.

Fig. 3 is a perspective view of a portion of the finished belt.

Referring to the drawing, the belt in its preferred form comprises a plurality of endless, annular cable cores 10, 10 which are free of splices and have only two cord-ends in each, so that they are of uniform flexibility throughout, to avoid pulsations and destructive localized bendings such as occur in the case of a belt core having a splice or a localized region of core-endings.

The cores 10 are embedded and laterally spaced apart in a cushion body of rubber 11 which completely insulates them from a two-ply, weak-wefted or weftless cord-fabric cover 12 enclosing the cushion body 11.

The cover fabric is so applied in this preferred embodiment that its strength-giving cords, 13, 13, extend obliquely, with the cords of one ply crossing those of the other, for efficient transmission of the driving forces from the radially remote portions of the pulley-groove walls to the cores 10, 10 at the driving pulley and from the cores 10, 10 to the radially remote portions of the pulley-groove walls at the driven pulley.

Each of the cores 10 is preferably formed, as shown in Fig. 1, by arranging an end portion of a cord in the form of a circle to provide a winding form and then winding the cord helically upon the circularly arranged portion, in a plurality of helical courses, until a core of the desired strength is obtained.

Preferably the stretchability of the cord is reduced before it is wound into the core, as by wetting it and drying it under tension, and the wetting preferably is effected by the use of a natural or artificial aqueous dispersion of rubber, so that the drying coagulates a deposit of rubber in the interstices of the cord and provides a desirable rubberizing of the cord, in conjunction with the setting of the cord in its elongated condition.

The cover conveniently may be applied in known types of ring-covering machines.

When the belt has been assembled in substantially the form shown in Fig. 3 it is vulcanized under longitudinal tension and transverse pressure in a mold to produce the finished, vulcanized belt of Fig. 3.

It is believed that the remarkably high power-transmission efficiency and corresponding long life of the belt, especially under heavy load and at high speed, are attained by reason of high flexibility combined with high resistance to stretch, both of which are opposed to destructive absorption of power in the material of the belt and such as occurs when a strong force is necessary for bending a belt into conformance with the pulley or when a belt undergoes a high percentage of stretch in passing from the driven pulley into the drive reach and then correspondingly shortens in passing from the drive pulley into the slack or return reach.

The characteristics of high flexibility and resistance to stretch are contributed to by the use of a plurality of the cores, which permits an adequate amount of the strength-giving core material to be localized in the "neutral zone" of the belt, and the plurality of cores also provides strength-giving core material sufficiently close to each of the driving faces of the belt to permit the use of the non-fibrous rubber body 11, for high flexibility and avoidance of heat generation, throughout a large portion of the cross-sectional area of the belt, and without excessive radial displacement of the cores in the belt body. Such arrangement of the core material also assures efficient transmission of force from the cover to the core material even though the fit of the belt in the pulley groove is imperfect.

The cabled structure of the cores gives them high flexibility in conjunction with strength, especially when a plurality of them are employed, so that each may be of small diameter and consequently not be required to extend far in either direction radially from the "neutral axis" or that part of the belt which neither elongates nor contracts longitudinally in the running of the belt onto or off of the pulley.

Flexibility in conjunction with strength against power-consuming and destructive stretch also is contributed to by the weak-wefted or weftless cord-fabric cover, which is adapted to be easily flexed by reason of the insulation of the strength giving cords from each other by the rubber and the consequent absence of the sawing action of one cord on another such as occurs in a square-woven fabric cover.

An advantage of the belt constructed with two flexible and substantially non-extensible cores as shown in the drawing is that it provides such proximity of each core to the adjacent driving face of the belt that but little flexing of the rubber between each core and the adjacent driving face of the belt is caused by transmission of the load from the face to the core. In other words, there is but little longitudinal shift of the relative positions of the cores and cover as the belt enters and leaves the tensioned reach, thus internal heating is greatly reduced.

Also, the two core construction with the flexible rubber body permits lateral rotative self adjustment of the belt in its groove to an extent sufficient to accurately distribute the load between the two cores without destructive internal friction when the cores vary slightly in circumference, and thereby prevents overloading of an individual core.

While we have here shown and described the preferred embodiment of our invention, various modifications are possible without sacrifice of all of the advantages of the invention and within the scope of the appended claims.

We claim:

1. The method of making an endless transmission belt which comprises wetting a cord, drying it under tension to reduce its extensibility, impregnating it with a rubber compound, arranging an end portion thereof in the form of a loop, and winding the remainder of the cord on the loop so formed in a plurality of helical courses to provide an endless cabled core.

2. The method of making an endless transmission belt which comprises wetting a cord with an aqueous dispersion of rubber, drying it under tension to reduce its extensibility, arranging an end portion thereof in a loop, and winding the remainder of the cord on the loop so formed in a plurality of helical courses to provide an endless cabled core.

3. The method of making an endless transmission belt which comprises wetting a cord with an artificial aqueous dispersion of rubber, drying it under tension to reduce its extensibility, arranging an end portion thereof in a loop, and winding the remainder of the cord on the loop so formed in a plurality of helical courses to provide an endless cabled core.

4. The method of making an endless transmission belt which comprises wetting a cord while impregnating it with rubber, drying the cord under tension to reduce its extensibility, forming a plurality of endless grommets therefrom, each comprising a plurality of integral helical courses cabled together under tension, and arranging the grommets in parallel spaced relation in a body comprising rubber material.

5. The method of making an endless transmission belt which comprises wetting a cord with an aqueous dispersion of rubber, drying the cord under tension to reduce its extensibility, forming a plurality of endless grommets therefrom each comprising a plurality of integral helical courses cabled together under tension, and arranging the grommets in parallel spaced relation in a body comprising rubber material.

ALLAN B. MERRILL.
GEORGE H. STEWART.